United States Patent
Jaeker

(10) Patent No.: US 7,845,155 B2
(45) Date of Patent: Dec. 7, 2010

(54) SIDE WALL SEGMENT FOR A LINE GUIDING DEVICE, LINE GUIDING DEVICE WITH SIDE WALL SEGMENT, AND METHOD FOR MANUFACTURING THE SIDE WALL SEGMENT

(75) Inventor: Thilo-Alexander Jaeker, Sankt Augustin (DE)

(73) Assignee: Igus GmbH, Cologne (DE)

( * ) Notice: Subject to any disclaimer, the term of this patent is extended or adjusted under 35 U.S.C. 154(b) by 292 days.

(21) Appl. No.: 12/102,230

(22) Filed: Apr. 14, 2008

(65) Prior Publication Data

US 2008/0256921 A1 Oct. 23, 2008

(30) Foreign Application Priority Data

Apr. 13, 2007 (DE) ........................ 10 2007 017 940

(51) Int. Cl.
*F16G 13/00* (2006.01)
(52) U.S. Cl. ............................... 59/78.1; 59/90; 59/900; 248/49
(58) Field of Classification Search ...................... 59/78, 59/78.1, 90, 900; 248/49, 51
See application file for complete search history.

(56) References Cited

U.S. PATENT DOCUMENTS

| | | |
|---|---|---|
| 6,354,070 B1 | 3/2002 | Blase |
| 6,387,002 B1 | 5/2002 | Gunter |

(Continued)

FOREIGN PATENT DOCUMENTS

DE 19701706 9/1998

(Continued)

OTHER PUBLICATIONS

German Search Report received Mar. 25, 2008 issued in related German Patent Application No. 102007017940.7.

(Continued)

*Primary Examiner*—David B Jones
(74) *Attorney, Agent, or Firm*—Grossman Tucker Perreault & Pfleger, PLLC

(57) ABSTRACT

The invention relates to a side wall segment for a line guiding device consisting of links connected to each other in pivoting fashion, each of which displays two opposite side parts that are connected to the immediately adjacent side parts in a manner permitting pivoting in a pivoting plane, and display stops for limiting the pivoting angle, where multiple side parts connected to each other form the side wall segment. The invention furthermore relates to a line guiding device with a side wall segment, and a method for manufacturing the side wall segment.

Figure 1:
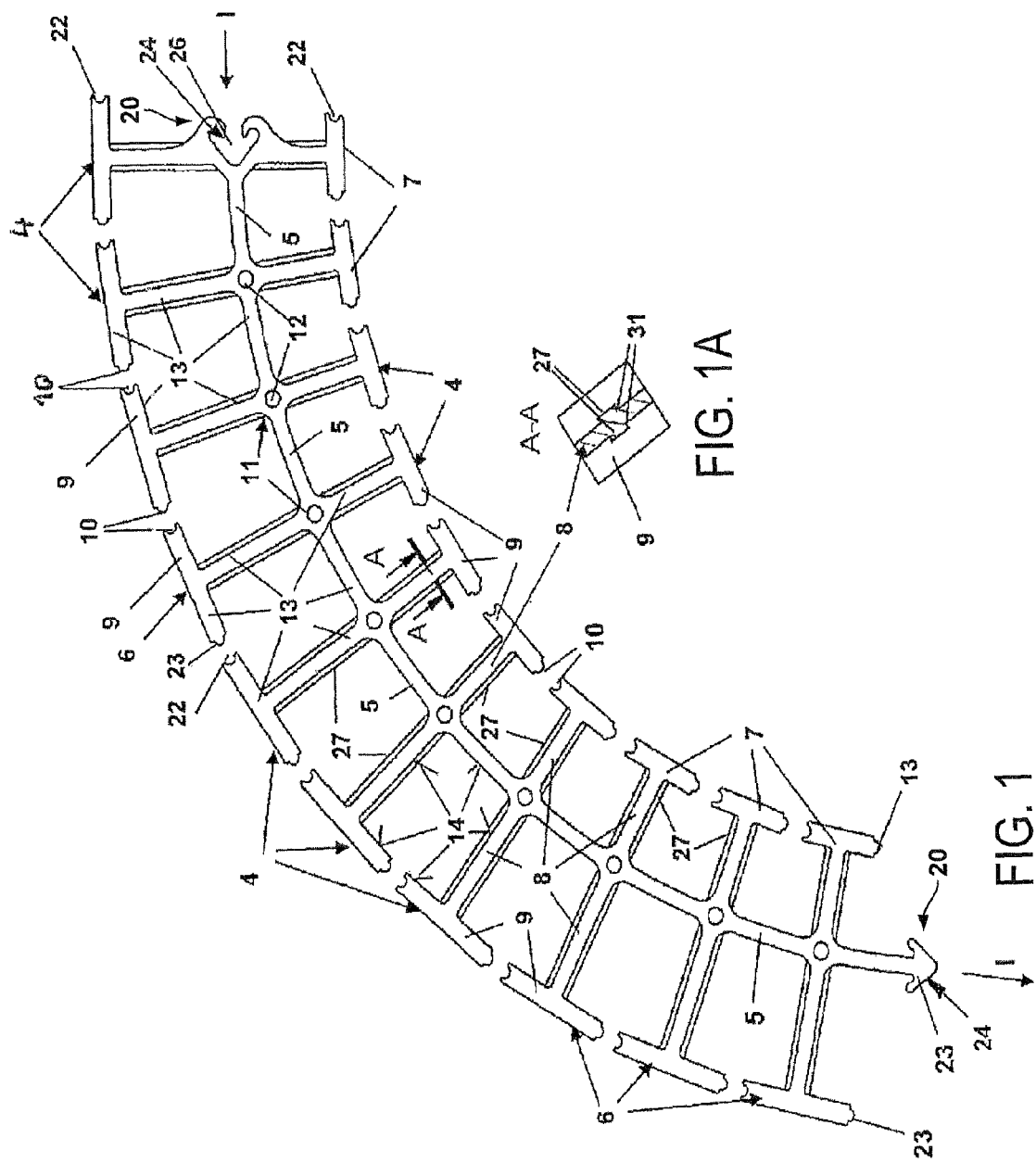

It is proposed that the side parts of the side wall segments be connected to each other in one piece by a connecting web that runs in the longitudinal direction of the side wall segment and is flexible in the pivoting plane, and display a web, running essentially perpendicularly to this connecting web in the pivoting plane, that has a T-shaped longitudinal section with a base web and a cross-web, where the base web is connected to the connecting web and the cross-web is located on the end of the base web opposite the connecting web, and the face ends of the cross-webs pointing in the longitudinal direction of the web form the stops for limiting the pivoting angle.

24 Claims, 6 Drawing Sheets

U.S. PATENT DOCUMENTS

| | | |
|---|---|---|
| 6,708,480 B1 | 3/2004 | Wehler |
| 6,725,642 B2 * | 4/2004 | Tsutsumi et al. .............. 59/900 |
| 7,204,075 B2 * | 4/2007 | Utaki ......................... 59/78.1 |
| 7,392,650 B2 * | 7/2008 | Utaki et al. ................. 59/78.1 |
| 7,428,808 B2 * | 9/2008 | Utaki et al. ................. 248/49 |
| 7,513,096 B2 * | 4/2009 | Utaki et al. ................. 248/51 |
| 2001/0007286 A1 | 7/2001 | Richter |
| 2001/0025715 A1 | 10/2001 | Muller et al. |
| 2003/0000198 A1 | 1/2003 | Hermey et al. |
| 2006/0201840 A1 | 9/2006 | Utaki |

FOREIGN PATENT DOCUMENTS

| | | |
|---|---|---|
| DE | 19837231 | 2/2000 |
| DE | 19840012 | 4/2000 |
| DE | 19860948 | 2/2002 |
| DE | 20107003 | 10/2002 |
| DE | 102005004453 | 8/2006 |
| EP | 1351362 | 10/2003 |

OTHER PUBLICATIONS

International Search Report and Written Opinion dated Jul. 31, 2008 issued in related International Patent Application No. PCT/DE2008/000605.

* cited by examiner

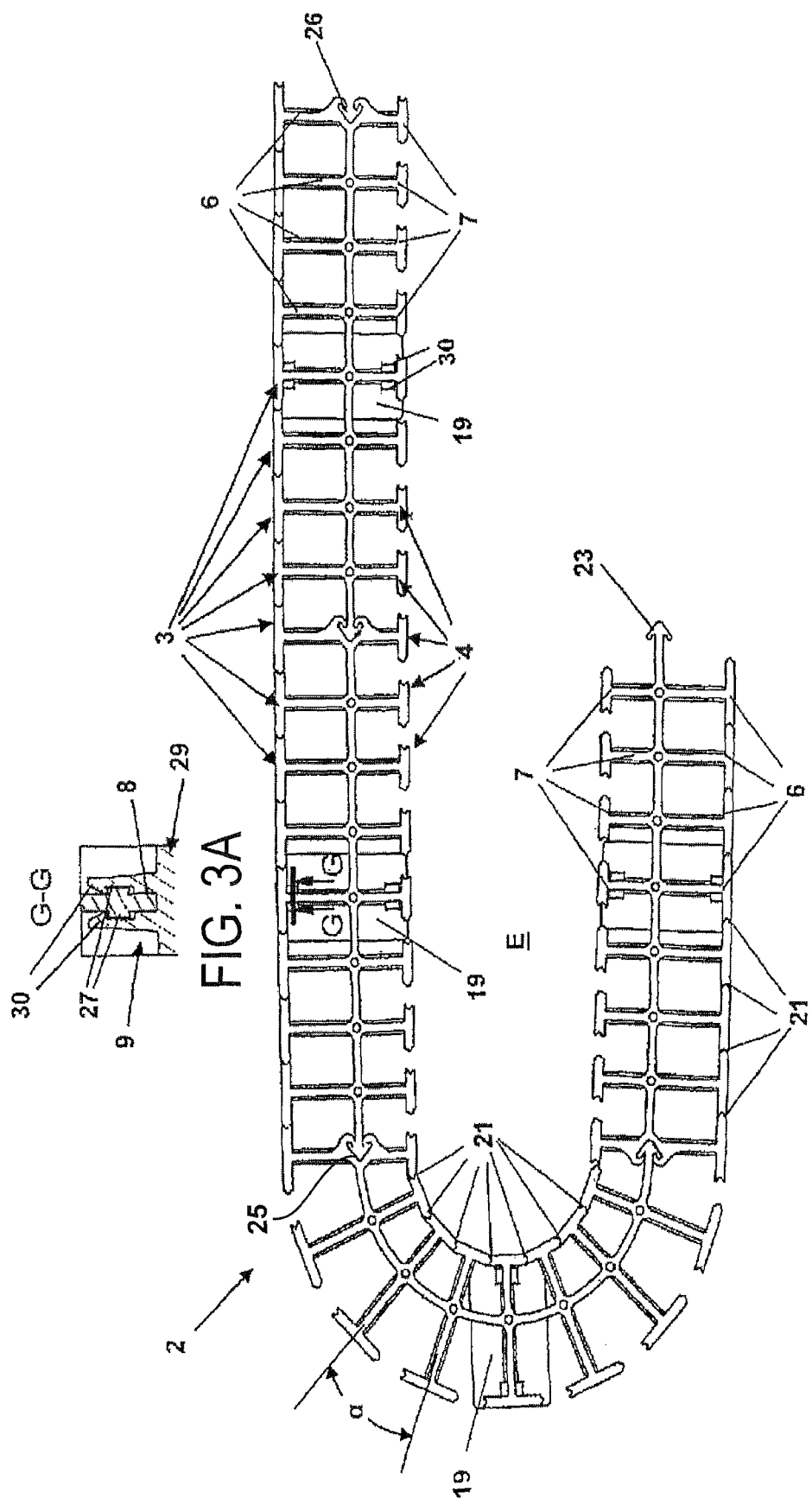

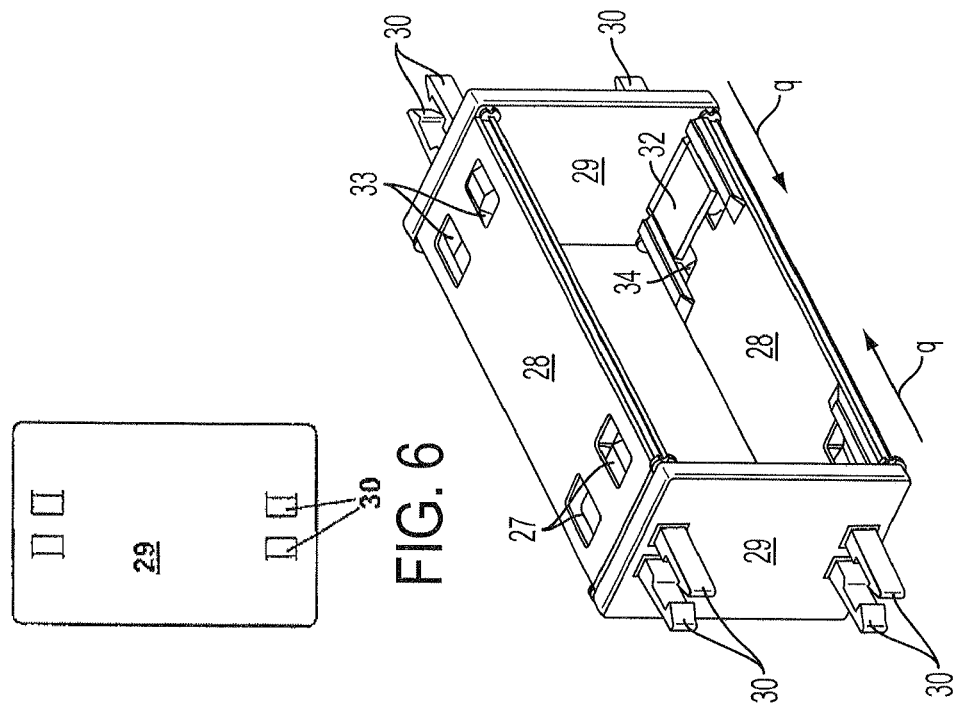
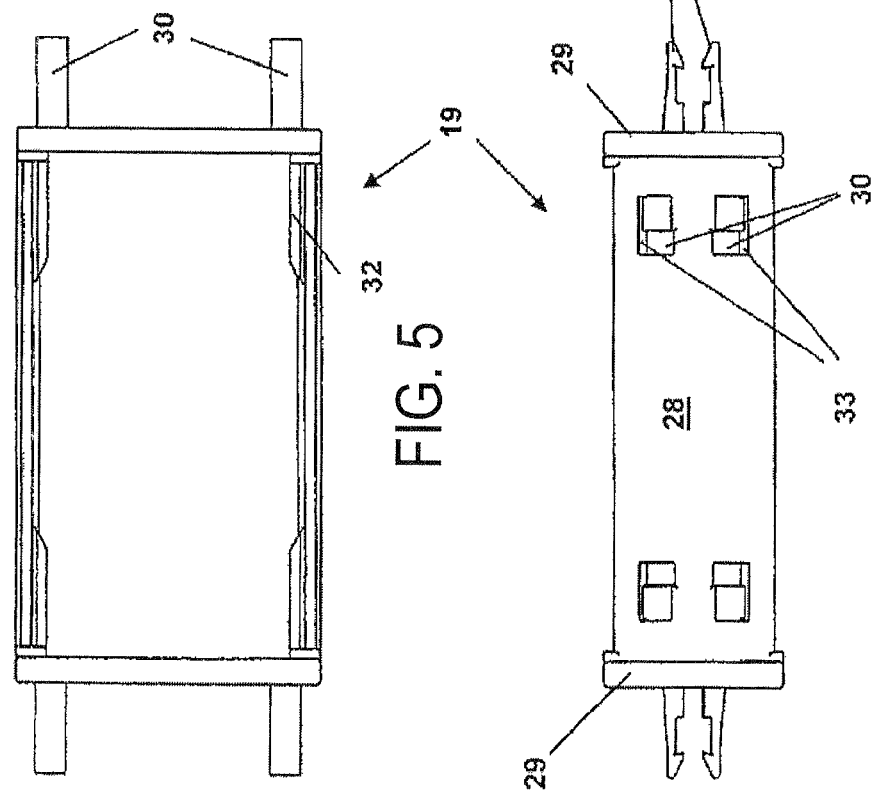

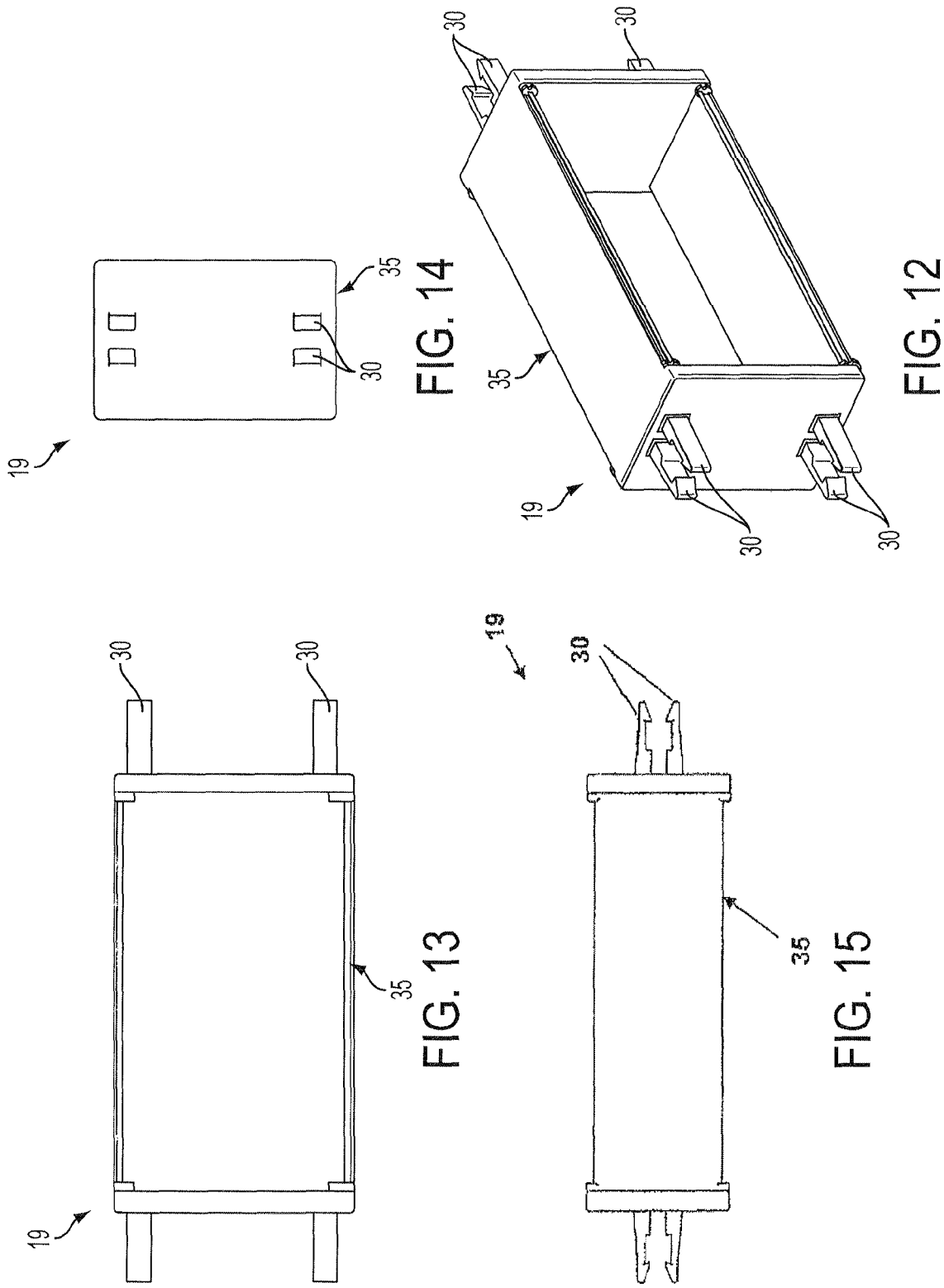

SIDE WALL SEGMENT FOR A LINE GUIDING DEVICE, LINE GUIDING DEVICE WITH SIDE WALL SEGMENT, AND METHOD FOR MANUFACTURING THE SIDE WALL SEGMENT

The invention relates to a side wall segment for a line guiding device consisting of links connected to each other in pivoting fashion, each of which displays two opposite side parts that are connected to the immediately adjacent side parts in a manner permitting pivoting in a pivoting plane, and display stops for limiting the pivoting angle, where multiple side parts connected to each other form the side wall segment. The invention furthermore relates to a line guiding device and a method for manufacturing the side wall segment.

Known line guiding devices are described in DE 201 07 003 U1, DE 198 60 948 C2 and EP 1 351 362 A2, for example, but they are complex in terms of their structure, manufacture, and assembly.

The object of the invention is therefore to provide a side wall segment of the kind mentioned in the opening paragraph that is of simple structure, less complex to manufacture, and easy to assemble.

According to the invention, the object is solved in that, on a side wall segment of the kind mentioned in the opening paragraph, the side parts are connected to each other in one piece by a connecting web that runs in the longitudinal direction of the side wall segment and is flexible in the pivoting plane, and display a web, running essentially perpendicularly to this connecting web in the pivoting plane, that has a T-shaped longitudinal section with a base web and a cross-web, where the base web is connected to the connecting web and the cross-web is located on the end of the base web opposite the connecting web, and the face ends of the cross-webs pointing in the longitudinal direction of the connecting web form the stops for limiting the pivoting angle.

A very simply structured, one-piece side wall segment with a connecting web and webs is proposed, where the webs of T-shaped form are reduced to the minimum form necessary for laterally delimiting a line guiding channel of the energy guiding chain and, by means of the stops provided on the ends of the cross-web, provide limitation of the pivoting angle. In this context, the stops of adjacent webs of a side wall segment that face each other can strike each other and, in installed position in the line guiding device, the outer webs of a side wall segment in relation to the longitudinal direction can strike the respectively outer stop of the side wall segment adjacent in the longitudinal direction that faces them. The T-shape additionally makes it possible to save on the amount of material to be used for the side wall segment.

Furthermore, the side wall segment can be simply manufactured as a one-piece component, preferably as a one-piece injection molding, that is moreover easy to remove from the mold after injection molding thanks to the T-shape of its webs.

The side wall segment can in principle be designed to have such a length that it forms a single, continuous side wall for the entire line guiding device.

Preferably, however, the side wall segment can be used as part of a side wall for lateral delimitation and/or as part of a center wall for dividing a line guiding channel of the line guiding device.

The webs are preferably of plate-like design, with lateral narrow sides spaced apart in parallel fashion and large side faces spaced apart in parallel fashion. In this context, their lateral narrow sides can in each case be arranged parallel to the pivoting plane, their large side faces extending in a direction transverse thereto. This further simplification of the shape yields further savings on material and simplifies manufacture, since it makes it possible to avoid undercuts in a mold removal direction in the transverse direction or perpendicular to the pivoting plane.

In a preferred embodiment of the side wall segment, the connecting web can likewise be of plate-like design, with lateral narrow sides spaced apart in parallel fashion and large side faces spaced apart in parallel fashion. In this context, its lateral narrow sides are located in the pivoting plane in each case. The lateral narrow sides of the connecting web and those of the webs can preferably lie in a common plane. This means that the large side faces of the webs and of the connecting web display the same extension in the transverse direction. Given a straight shape of the connecting web, the envelope geometry of the side wall segment is then essentially a flat cuboid, where the narrow sides of the webs and of the connecting web define the side faces arranged parallel to each other, and the webs and the connecting web delimit rectangular through-holes of the side wall segment, running in the transverse direction.

Advantageously, the width of the narrow sides of the webs and/or of the connecting web can be substantially smaller than that of the large side faces. To this end, the ratio of the width of the narrow sides of the webs and/or of the connecting web to the width of the large side faces of the webs and/or of the connecting web can be roughly 1:2 to 1:20, favorably roughly 1:3 to 1:10, particularly preferably roughly 1:5. The optimum ratio is dependent on, among other things, the strength properties of the material used for the side wall segment, the longitudinal extensions of the webs or the overall dimensions of the webs, and the loading to be expected. Easy flexibility of the side wall segment can be achieved thanks to the slender T-shape of the webs and/or of the connecting web. A reduced material requirement also means a smaller inert mass of the side wall segment, which can promote easy movability of the side wall segment.

Furthermore, the webs can in each case be an equal distance away from their adjacent webs. In the stretched position of the side wall segment, in which the connecting web is straight, they are preferably arranged perpendicularly to the connecting web. This regular and symmetrical arrangement in a row facilitates manufacture. Expediently, the outer webs of two adjacent side wall segments that are opposite each other when in the installed position in the line guiding device are also arranged at the same distance from each other as the webs of the side wall segments. As a result, uniform stringing of the webs is obtained in the installed position in the line guiding device, such that the mechanical properties of the line guiding device can be essentially constant over its longitudinal extension in relation to the webs.

The webs of a side wall segment can extend from a first side of the connecting web as first webs. The stops positioned opposite each other in pairs can then contact each other in the stretched position of the side wall segment, in which the side wall segment is straight or almost straight. To this end, the longitudinal extension of the cross-webs of the first webs is designed such that their stops come into contact in the stretched position.

As second webs, the webs can also extend from a second side of the connecting web facing away from the first side, where their stops positioned opposite each other in pairs contact each other in the bent position of the side wall segment, in which the side wall segment is bent in the pivoting plane. The line guiding device can customarily be traversable over a travel path in the pivoting plane, forming a first strand, a deflection zone and a second strand, where the side element is in the bent position in the deflection zone and in the stretched position in the strands. In this context, the second side of the connecting web in each case faces towards the interior space between the strands, while the first side faces away from the second side, and thus towards the outside. The longitudinal extension of the cross-webs of the second webs is designed in such a way that their stops come into contact in the bent position, whereas they are a distance apart from each other in the stretched position, and the longitudinal extension of the cross-webs of the first webs is designed in such a way that their stops come into contact in the stretched position, whereas they are a distance apart from each other in the bent position. As a result, the side element is essentially stabilized mechanically by the stops making contact, except in transitional areas between the strands and the deflection zone.

One first web and one second web can in each case be arranged in line with each other in reference to their base webs, and form a point of intersection with the connecting web. To save material and for better flexibility of the side wall segment at the point of intersection, said point can display a central through-hole, running perpendicularly to the pivoting plane.

Regarding its position relative to the stops of the first and second webs extending from it on both sides, the connecting web can be positioned eccentrically to the stops, where the stops of the first web are a greater distance away from the connecting web than those of the second web. While the distance between the webs remains unchanged, this permits a greater pivoting angle, limited by the stops, than with a central position of the connecting web.

In a preferred development of the side wall segment, the stops respectively located on adjacent webs and facing towards each other are designed as plug-in connections. This makes it possible to increase the mechanical stability of the side wall segment. To this end, one stop preferably displays a preferably V-shaped plug-in groove running perpendicularly to the pivoting plane, while the other stop in each case displays a plug-in projection with a shape and orientation adapted to the plug-in groove for engaging the plug-in groove in the stop position. As a result, additional forces can be transmitted in the longitudinal direction of the webs via the plug-in connection, such that slipping-off of the stops in this direction can be prevented. This plug-in connection is established automatically when the stops come into contact.

Advantageously, connecting means, designed as plug-in elements for connecting the side wall segment to adjacent side wall segments in the line guiding device in a connecting position, are provided on the end side of the connecting web. As a result, two side wall segments can easily be connected to each other at the end side. In this context, plug-in elements of adjacent side wall segments that face towards each other in the connecting position can form a plug-and-socket pair and be insertable into each other in an insertion direction perpendicular to the pivoting plane.

It is considered to be advantageous that one plug-in element of a plug-and-socket pair displays a plug-in projection having an arrow-like cross-sectional shape in relation to the pivoting plane, and the other plug-in element of the plug-and-socket pair displays a plug-in opening, adapted to the arrow shape and extending in the insertion direction, for receiving the plug-in projection. As a result, forces can be transmitted in the pivoting plane and, owing to the frictional adhesion preferably provided between the plug-in elements, also in the insertion direction. The friction is increased by the arrow shape with its preferably pronounced undercuts, by means of which the arrow shape can acquire a more linear cross-section, since the contact areas between the plug-in elements are increased in this way.

To connect the side wall segment to a cross-piece for forming a line guiding channel, the webs can in each case preferably display a connecting element on the large side faces facing towards each other. The connecting element can be designed as a snap-in projection that extends in the longitudinal extension of the connecting web and is preferably located in the middle on the associated side face and running in the longitudinal extension of the base web. As a result, forces can, in installed position, be transmitted perpendicularly to the pivoting plane via a snap connection to the cross-piece.

Particularly preferred is an embodiment of the side wall segment where, when in a resting position in which it is mechanically unstressed, it displays a curved shape with a curvature lying in the pivoting plane. This curvature more expediently lies between the curvature defined by the stretched position and the curvature defined by the bent position. As a result, the side wall segment can be pretensioned into the bent position and into the stretched position. In installed position in the line guiding device, the effect of this can be that, owing to pretensioning into the stretched position, one strand sags less or even forms a upwardly curved arch. Furthermore, as a result of pretensioning into the bent position, the links can more easily be guided out of the bent position in the deflection zone and into the stretched position in the upper strand or the lower strand. The curvature is preferably constant in resting position, particularly in the form of an arc of a circle, or roughly in the form of an arc of a circle, with a center of a circle. As a result, the first webs can be designed to extend away from, and the second webs towards, the center of the circle in resting position.

In an alternative embodiment, the side wall segment can, when in the resting position in which it is mechanically unstressed, be straight or almost straight, as in its stretched position.

The object can be solved by providing a line guiding device for guiding hoses, cables or similar in a line guiding channel comprising links connected to each other in pivoting fashion, which each display two opposite side parts that are connected to the immediately adjacent side parts in a manner permitting pivoting in a pivoting plane, and stops for limiting the pivoting angle, where multiple side parts connected to each other form a side wall segment according to one of the embodiments described above, and at least one pair of opposite side parts is connected by means of a cross-piece.

To construct the line guiding device, the end sides of the connecting webs of the side wall segments can be connected to each other to form a side wall. In this context, loops, e.g. in the form of cable ties, can be fitted on the side wall at defined intervals for fixing hoses, cables or other flexible lines on the side wall.

Preferably, however, two side walls are arranged parallel to each other in the line guiding device and connected by means of a cross-piece on preferably a small number of links to delimit the line guiding channel.

The cross-piece can display at least one cross-piece web, preferably two cross-piece webs, that delimit the line guiding channel at the top and the bottom in installed position, or a peripherally closed line guiding channel section with a preferably rectangular cross-section. To connect the cross-piece webs or the line guiding channel section, connecting elements can be provided, by means of which the cross-piece web or the line guiding channel section can be connected to the side wall segments in positive and/or non-positive fashion, and preferably disconnected from them again. The connecting elements are preferably designed such that they can be preferably snap-fitted to a cross-piece web and to a side wall segment, or that they are connected to the respective line guiding channel section in one piece and can be preferably snap-fitted to a side wall segment.

The side wall segments can display connecting elements, described above and designed as snap-in projections, where provision is preferably made for the connecting elements to display at least one pair of snap hooks of claw-like design. Said snap hooks can laterally reach around the base web under spring loading and snap fit on a snap-in projection provided there and already described above. The snap-in projection can display an undercut for more stable snap-fitting. The connecting element with the pair of snap hooks thus merely has to be slid laterally onto the base web until a snap-in position is reached. The snap hooks are expediently dimensioned such that, when in snap-in position, the narrow side of the base web strikes the connecting element or the line guiding channel section.

To form a plug-in connection between the cross-piece web and the connecting element, the latter can display a connecting web extending perpendicularly to the pivoting plane and having a cross-section that is preferably T-shaped in the transverse direction. Accordingly, the end side of the cross-piece web can in each case display a connecting groove that is adapted to the associated connecting web and engaged by this connecting web to establish a detachable connection to the cross-piece web. The connecting web is preferably of plate-like design, with narrow sides in the transverse direction and longitudinal direction of the side wall segment, this making it possible to achieve the most space-saving possible delimitation of the line guiding channel and prevent rotation of the connecting web and the connecting groove.

In a development of the plug-in connection, the free end of the connecting web can be provided with at least one snap-in projection, preferably two snap-in projections, that extend in the longitudinal direction of the web when in installed position and engage snap-in openings provided on the cross-piece web in a snap-in position when in installed position. The two snap-in projections can preferably be arranged next to each other and at the same level in relation to the transverse direction. With the pair of snap hooks, the connecting webs and the snap-in projections, this creates a stable plug-in/snap-in connection between the respective side wall segment and the cross-piece web, via which forces and moments of forces in all directions can be transmitted.

The line guiding device can thus be constructed from components that can be connected to each other, and disconnected again, by means of plug-in connections or snap connections. The line guiding device can thus be assembled, according to a modular principle and in the required dimensions, from correspondingly dimensioned components, where, for example, the length of the connecting webs used can be dimensioned in accordance with a required width of the line guiding channel. For assembly of a line guiding device, components preferably having standardized sizes can thus be provided, which can be combined with each other to vary the dimensions of the line guiding device.

It goes without saying that the side wall segment, the cross-piece web, the connecting elements and/or the line guiding channel section can each be one-piece moldings, especially plastic injection moldings.

To solve the object, a method for manufacturing a side wall segment according to one of the previously described embodiments for a line guiding device according to one of the previously described embodiments from links connected to each other in pivoting fashion is proposed that comprises the following process steps:

Molding, especially injection molding, of the side wall segment, where the side wall segment displays a curved shape in the pivoting plane, in which the stops are spaced apart from each other, Stressing of the molded side wall segment with a mechanical pre-tension in a tensioning mold, by means of which the side wall segment is given a specific curvature lying in the pivoting plane that is smaller than or equal to that of the side wall segment in the bent position, or by means of which the side wall segment is given a straight or essentially straight shape, and Heat treatment of the side wall segment in the tensioning mold at a temperature at which the side wall segment stressed with the mechanical pre-tension at least partially relaxes.

The side wall segment can subsequently be removed from the tensioning mold.

With the help of this method, it is possible to manufacture a side wall segment that is in the stretched position or in the bent position, in which the stops of the first webs or those of the second webs, respectively, are in contact because, due to the molding process, the stops of the side wall segment are spaced apart before heat treatment. Stressing of the molded side wall segment with a pre-tension, and subsequent heat treatment, make it possible to give the side wall segment a desired curved shape, in which the stops are moved into a specific position relative to each other. This can mean that the stops of the first webs are in contact, or the stops of the second webs. To create a pre-tension in the installed position of the side wall segment in the line guiding device, provision can also be made for the side wall segment to be brought into a curved position with a curvature that is between that of the bent position and that of the stretched position.

Alternatively, or also additionally, the side wall segment can also be composed of several plastics and, in this context, preferably manufactured by means of a multi-component molding method, especially by a sandwich molding method. In this context, the plastics can be selected in such a way as regards their mechanical properties that they support the mechanical function of the respective part of the side wall segment. To this end, a flexible plastic can be provided for the connecting web, for example, while that used for the webs can display particular load-bearing capacity or mechanical stability. Alternatively, different plastics with different setting temperatures could also be used, for example.

In a modification of the method, the side wall segment can be cooled in the tensioning mold after heat treatment and before removal from the mold.

Figure 2:
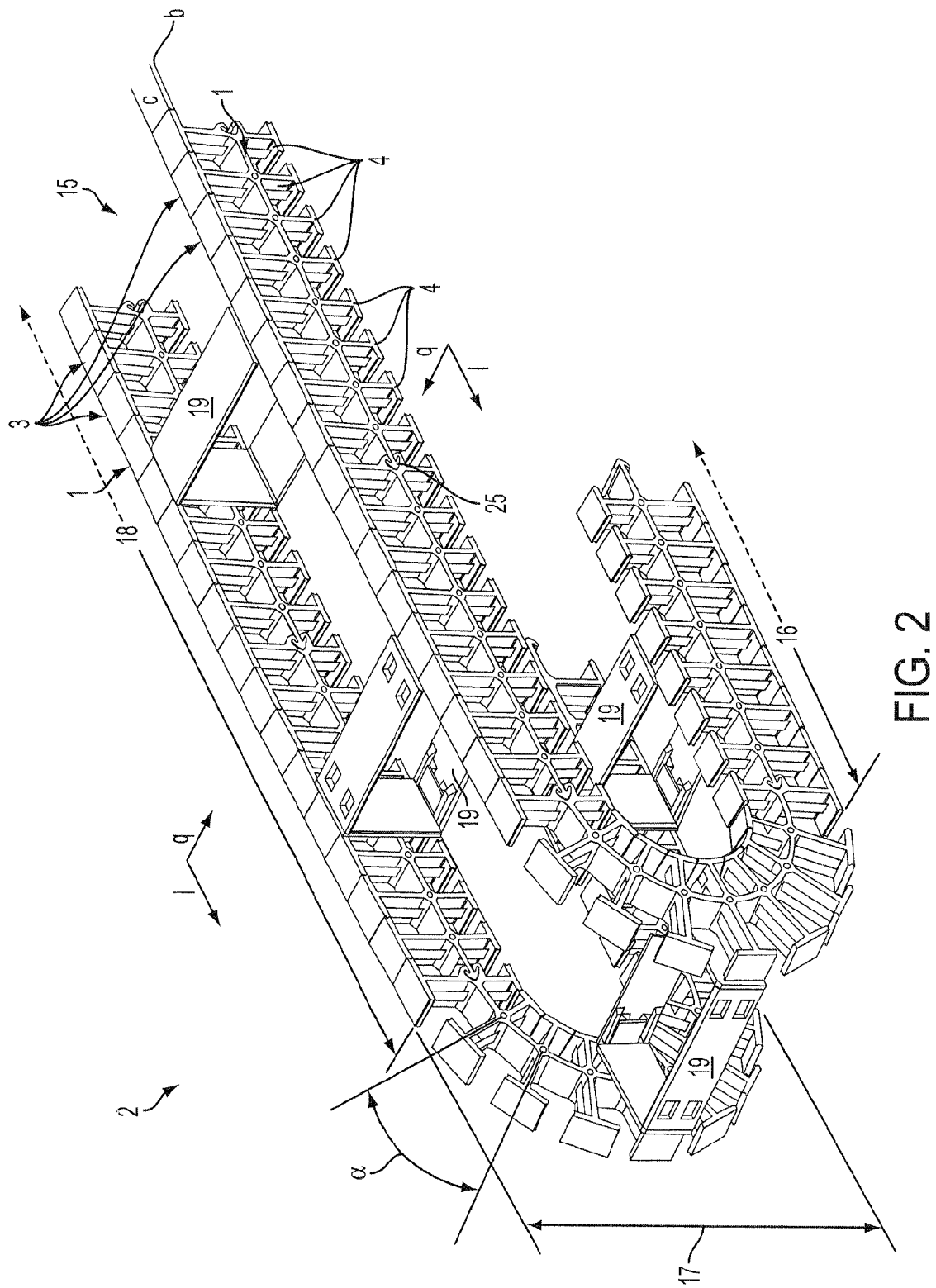
Figure 10:
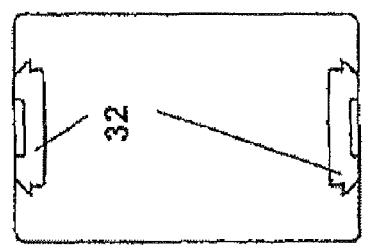
Figure 8:
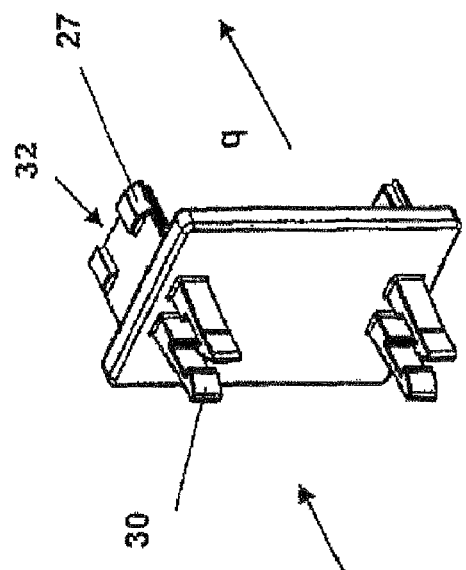
Figure 9:
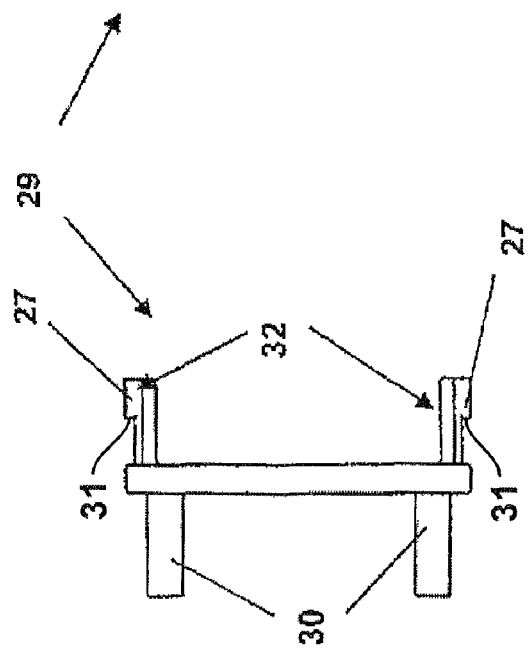
Figure 11:
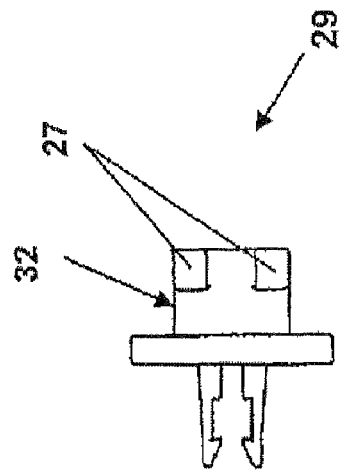

The present invention is described in more detail below on the basis of several embodiments shown in the drawings. The Figures show the following:

FIG. 1 A side view of a side wall segment,

FIG. 1a A sectional view along line A-A in FIG. 1,

FIG. 2 A perspective view of a section of a line guiding device with side wall segments according to FIG. 1, FIG. 3 A side view of the line guiding device according to FIG. 2, FIG. 3a A sectional view along line G-G in FIG. 3, FIG. 4 A perspective view of a first embodiment of a cross-piece for the line guiding device according to FIG. 2, FIG. 5 A side view of the cross-piece according to FIG. 4, FIG. 6 An end view of the cross-piece according to FIG. 4, FIG. 7 A top view of the cross-piece according to FIG. 4, FIG. 8 A perspective view of a first embodiment of a connecting element for the first embodiment of the cross-piece according to FIG. 4, FIG. 9 A side view of the connecting element according to FIG. 8, FIG. 10 An end view of the connecting element according to FIG. 8, FIG. 11 A top view of the connecting element according to FIG. 8, FIG. 12 A perspective view of a second embodiment of the cross-piece, FIG. 13 A side view of the cross-piece according to FIG. 12, FIG. 14 An end view of the cross-piece according to FIG. 12, and FIG. 15 A top view of the cross-piece according to FIG. 12.

FIG. 1 shows a side view of a side wall segment 1 for a line guiding device 2, shown in FIG. 2, comprising links 3 connected to each other in pivoting fashion, which can be pivoted in a pivoting plane E, which corresponds to the drawing plane in FIGS. 1 and 3. Side wall segment 1 displays multiple side parts 4, which are connected to each other in one piece by a connecting web 5 that runs in longitudinal direction l and is flexible in pivoting plane E. Side parts 4 each display a first web 6 and a second web 7, each with a base web 8 and a cross-web 9, where base web 8 is connected to connecting web 5, and cross-web 9 is located on the end of base web 8 opposite connecting web 5. The face ends of cross-webs 9 pointing in longitudinal direction l of connecting web 5 display stops 10 for limiting a pivoting angle α, shown in FIGS. 2 and 3. In this context, a first web 6 and a second web 7 are in each case arranged in line with each other and, with connecting web 5, form a point of intersection 11 displaying a central through-hole 12, running perpendicularly to pivoting plane E.

Regarding its position relative to stops 10 of the two webs 6, 7 extending from it on both sides, connecting web 5 is positioned eccentrically to stops 10, where stops 10 of first web 6 are a greater distance away from connecting web 5 than those of second web 7.

Webs 5, 6, 7 are of plate-like design, with narrow sides 13 spaced apart in parallel fashion and large side faces 14 spaced apart in parallel fashion. Apart from narrow sides 13 that simultaneously form the face ends of cross-web 9 with stops 10, narrow sides 13 are located in pivoting plane E. Large side faces 14 extend perpendicularly to pivoting plane E and in a transverse direction q. A width b of narrow side 13 of webs 6, 7 and connecting web 5 displays a ratio of roughly 1:5 to a width c of large side face 14 of webs 6, 7 and connecting web 5. Webs 6, 7 are in each case an equal distance from their adjacent webs 6, 7, and located perpendicularly to connecting web 5 when in the stretched position of side wall segment 1, shown in FIG. 2.

FIGS. 2 and 3 each show a section of line guiding device 2 for guiding hoses, cables and/or other flexible lines (not shown) in a line guiding channel with a plurality of links 3 connected to each other in articulated fashion. Line guiding device 2 can be traversed in pivoting plane E over a travel path not indicated here, forming a lower strand 16, a deflection zone 17 and an upper strand 18, routed above lower strand 16. Links 3 display two side parts 4, which are in this instance connected to each other by a cross-piece 19 in just a few cases. Adjacent side wall segments 1 are connected to each other in articulated fashion via connecting means 20, provided on the end side of their connecting webs 5 and interacting in pairs.

In lower strand 16 and upper strand 18, side wall segments 1 are in a stretched position, in which stops 10, located on cross-webs 9 of first webs 6, contact each other, while stops 10 of cross-webs 9 of second webs 7 are spaced apart from each other. In deflection zone 17, side wall segments 1 are in a bent position, in which side wall segment 1 is pivoted through pivoting angle α relative to an adjacent side wall segment 1. In this context, stops 10 of cross-webs 9 of second webs 7 contact each other, while stops 10 of cross-webs 9 of first webs 6 are the maximum distance apart from each other.

Stops 10, located on adjacent cross-webs 9 and facing towards each other, form a pair of stops 21, which form a plug-in connection when guided against each other in longitudinal direction l. To this end, one stop 10 of a pair of stops 21 displays a V-shaped plug-in groove 22, running perpendicularly to pivoting plane E, while the other stop 10 of the pair of stops 21 displays a plug-in projection 23, adapted to plug-in groove 22, where stops 10 engage each other when they come into contact. Forces perpendicular to longitudinal direction l and in pivoting plane E can be transmitted via this plug-in connection.

Connecting means 20, provided on the end side of connecting web 5, are designed as plug-in elements 24, where plug-in elements 24 of adjacent side wall segments 1 that face towards each other in a connecting position, shown in FIGS. 2 and 3, form a plug-and-socket pair 25 and can be inserted into each other in an insertion direction perpendicular to pivoting plane E and corresponding to transverse direction q. In this context, one plug-in element of plug-and-socket pair 25 is designed as a plug-in projection 23 having an arrow-like cross-sectional shape in relation to pivoting plane E. The other plug-in element 24 of plug-and-socket pair 25 displays a plug-in opening 26, adapted to the arrow shape and extending in transverse direction q, for receiving plug-in projection 23. As a result of this design of the plug-in connection, forces in pivoting plane E can be transmitted. As can be seen in FIG. 3, arrow-like plug-in projection 23 is located in plug-in opening 26 in close contact, such that, as a result of friction, forces perpendicular to pivoting plane E are also transmitted via this plug-in connection. The arrow-like design of plug-in projection 23 additionally increases the contact area between plug-in projection 23 and plug-in opening 26, and thus for frictional forces occurring, as a result of which more extensive load transmission perpendicularly to pivoting plane E becomes possible.

As can clearly be seen in FIGS. 1a and 3a, base webs 8 of webs 6, 7 display a snap-in projection 27 with a dovetail-like cross-section on both sides. As can be seen in FIG. 2, this is located centrally on associated large side face 14 of base web 8, extends in longitudinal direction l of connecting web 5 and runs in the longitudinal extension of base web 8, and thus perpendicularly to connecting web 5. Snap-in projection 27 serves to connect side wall segment 1 to cross-piece 19. Although each of the base webs 8 of webs 6, 7 displays a snap-in projection 27, thus optionally enabling fastening of a cross-piece 19 in each case, effective delimitation of line guiding channel 15 does not require fastening of a cross-piece 19 to every base web 8. As an example, only a few of the side parts 4 of links 3 are connected via a cross-piece 19 in FIGS. 2 and 3.

By way of example, cross-pieces 19 are show in the Figures here in two embodiments that are illustrated in more detail in the following FIGS. 4 to 15. FIGS. 4 to 7 show the first embodiment of cross-piece 19, which is also used in FIG. 2 on the front three cross-pieces in the drawing. This first embodiment of cross-piece 19 displays two cross-piece webs 28 and connecting elements 29, which connect cross-piece webs 28 and via which cross-piece 19 can be connected to snap-in projections 27 of side wall segments 1 and detached from them again. To this end, connecting elements 29 each display two pairs of snap hooks 30 of claw-like design that, to form a snap connection, laterally reach around the associated base webs of webs 6, 7 under elastic deflection and snap fit on snap-in projection 27, where the pair of snap hooks 30 engages undercut 31 of dovetail-shaped snap-in projection 27. In this locking position, the narrow side 13 of base web 8 that faces towards connecting element 29 is supported on connecting element 29. The locking position of the pair of snap hooks 30 on snap-in projection 27 is shown particularly clearly in FIG. 3a.

FIGS. 8 to 11 show connecting element 29 of the first embodiment of cross-piece 19. Connecting element 29 displays two connecting webs 32 that extend in transverse direction q and have a dovetail-shaped cross-section, as can be seen in FIG. 10. Provided on each end of the connecting webs are two snap-in projections 27 that, when in the installed position shown in FIGS. 4 to 7, engage in a locking position in snap-in openings 33 provided on the respective cross-piece web 28. When in the installed position, the face ends of cross-piece webs 28 lie against connecting elements 29 and are pressed at the face ends against connecting elements 29 by the snap-in projections, which are arranged in pairs and engage the respectively associated snap-in opening 33. In this context, snap-in projections 27 each contact a side of snap-in opening 33 that faces towards the respectively adjacent snap-in opening 33. To receive the respectively associated connecting web 32, cross-piece webs 28 display a connecting groove 34 of correspondingly dovetail-shaped design, into which connecting webs 32 are inserted until snap-in projections 27 engage snap-in openings 31 and the face ends of cross-piece webs 28 lie against connecting elements 29. As a result, plug-in/snap-in connections achieve stable fastening of cross-piece webs 28 on connecting elements 29 and, furthermore, stable connection of connecting elements 29 on side wall segments 1.

As can be seen from the description, line guiding device 2 with side wall segments 1 and cross-pieces 19 consists of components that can be fitted together or connected to each other by means of plug-in connections and/or snap-in connections. As a result, line guiding device 2 can be assembled from appropriately dimensioned components according to a modular principle to obtain the required dimensions. The dimensions shown here in the embodiments serve only as an example. Thus, line guiding channel 15 can, for example, be of much wider design. Similarly, the longitudinal extension of line guiding device 2 can be varied.

In the second embodiment, shown in FIGS. 12 to 15, cross-piece 19 is designed in one piece and displays a one-piece line guiding channel section 25 with connecting elements 29. In this instance, these connecting elements 29 are the pair of snap hooks 30. They can lock with snap-in projections 27 on base webs 8 in a plug-in/snap-in connection, in the same way as in the first embodiment of cross-piece 19.

LIST OF REFERENCE NUMBERS

1 Side wall segment
2 Line guiding device
3 Link
4 Side part
5 Connecting web
6 First web
7 Second web
8 Base web
9 Cross-web
10 Stop
11 Point of intersection
12 Through-hole
13 Narrow side
14 Side face
15 Line guiding channel
16 Lower strand
17 Deflection zone
18 Upper strand
19 Cross-piece
20 Connecting means
21 Pair of stops
22 Plug-in groove
23 Plug-in projection
24 Plug-in element
25 Plug-and-socket pair
26 Plug-in opening
27 Plug-in projection
28 Cross-piece web
29 Connecting element
30 Pair of snap hooks
31 Undercut
32 Connecting web
33 Snap-in opening
34 Connecting groove
35 Line guiding channel section
b Width
c Width
l Longitudinal direction
q Transverse direction
E Pivoting plane
α Pivoting angle

The invention claimed is:

1. Side wall segment for a line guiding device comprising links connected to each other in pivoting fashion, each of which includes two opposite side parts that are connected to immediately adjacent side parts in a manner permitting pivoting in a pivoting plane, and include stops for limiting a pivoting angle, where a plurality of said adjacent side parts are connected to each other form the side wall segment, wherein the side parts are connected to each other in one piece by a connecting web that runs in a longitudinal direction of the side wall segment and is flexible in the pivoting plane, and include in each case at least a web running essentially perpendicularly to said connecting web in the pivoting plane that has a T-shaped longitudinal section with a base web and a cross-web, where the base web is connected to the connecting web and the cross-web is located on an end of the base web opposite the connecting web, and face ends of the cross-webs point in said longitudinal direction to form said stops for limiting said pivoting angle.

2. Side wall segment according to claim 1, wherein the cross web having a T-shaped longitudinal section is of plate-like design, with lateral narrow sides spaced apart in parallel fashion and large side faces spaced apart in parallel fashion, where the lateral narrow sides are in each case arranged parallel to the pivoting plane and the large side faces extend in a transverse direction.

3. Side wall segment according to claim 2, wherein the connecting web is of plate-like design, with lateral narrow sides spaced apart in parallel fashion and large side faces spaced apart in parallel fashion, where the lateral narrow sides are in each case located parallel to the pivoting plane and lie in a common plane with the narrow sides of the web that has a T-shaped longitudinal section.

4. Side wall segment according to claim 2, wherein a width of the narrow sides of the cross web that has a T-shaped longitudinal section and/or of the connecting web has a ratio of 1:3 to 1:10 to a width of the large side faces of said web and/or of the connecting web.

5. Side wall segment according to claim 1, wherein the webs that have a T-shaped longitudinal section of the plurality of adjacent side parts connected to each other are in each case an equal distance away from their adjacent webs, and arranged perpendicularly to the connecting web when in a stretched position of the side wall segment, in which the side wall segment is straight or almost straight.

6. Side wall segment according to claim 1, wherein the webs that have a T-shaped longitudinal section of the plurality of adjacent side parts connected to each other extend from a first side of the connecting web as first webs, and their stops positioned opposite each other in pairs contact each other in a stretched position of the side wall segment, in which the side wall segment is straight or almost straight.

7. Side wall segment according to claim 6, wherein the webs that have a T-shaped longitudinal section of the plurality of adjacent side parts connected to each other extend from a second side of the connecting web facing away from the first side as second webs, and their stops positioned opposite each other in pairs contact each other in a bent position of the side wall segment, in which the side wall segment is bent in the pivoting plane.

8. Side wall segment according to claim 7, wherein said one first web and one second web are in each case arranged in line with each other in reference to their base webs, and form a point of intersection with the connecting web.

9. Side wall segment according to claim 8, wherein the point of intersection displays a central through-hole, running perpendicularly to the pivoting plane.

10. Side wall segment according to claim 7, wherein regarding its position relative to the stops of the webs extending from it on both sides, the connecting web is positioned eccentrically to the stops, where the stops of the first web are a greater distance away from the connecting web than those of the second web.

11. Side wall segment according to claim 1, wherein the stops located on adjacent webs that have a T-shaped longitudinal section of the plurality of adjacent side parts connected to each other and facing towards each other form a plug-in connection.

12. Side wall segment according to claim 11, wherein one of said stops includes a preferably V- or U-shaped plug-in groove running perpendicularly to the pivoting plane, and in that the other of said stops in each case includes a plug-in projection with a shape and orientation adapted to said plug-in groove for engaging the plug-in groove in the stop position.

13. Side wall segment according to claim 1, wherein connecting means, designed as plug-in elements for connecting the side wall segment to adjacent side wall segments in the line guiding device in a connecting position, are provided on the end side of the connecting web, where plug-in elements of adjacent side wall segments that face towards each other in the connecting position form a plug-and-socket pair and can be inserted into each other in an insertion direction perpendicular to the pivoting plane.

14. Side wall segment according to claim 13, wherein one plug-in element of a plug-and-socket pair includes at least one plug-in element which includes a plug-in projection having an arrow-like cross-sectional shape in relation to the pivoting plane, and another plug-in element of the plug-and-socket pair includes a plug-in opening, adapted to the arrow shape and extending in the insertion direction, for receiving the plug-in projection.

15. Side wall segment according to claim 1, wherein the webs that have a T-shaped longitudinal section of the plurality of adjacent side parts connected to each other in each case include a connecting means, on side faces facing towards each other, for connecting the side wall segment to the cross-piece to form a line guiding channel.

16. Side wall segment according to claim 15 wherein the connecting means is designed as a snap-in projection that extends in the longitudinal extension of the connecting web and is located in the middle on the associated side face and running in the longitudinal extension of the base web.

17. Side wall segment according to claim 1, wherein, when in a resting position in which it is mechanically unstressed, the side wall segment includes a curved shape with a curvature lying in the pivoting plane.

18. Side wall segment according to claim 1, wherein when in a resting position in which it is mechanically unstressed, the side wall segment is essentially straight.

19. Line guiding device in a line guiding channel, according to claim 1, wherein said two opposite side parts spaced apart in parallel fashion are connected by a cross-piece.

20. Line guiding device according to claim 19, wherein the cross-piece includes at least one cross-piece web or a peripherally closed line guiding channel section with a preferably rectangular cross-section, as well as connecting elements, by means of which the cross-piece web or the line guiding channel section can be connected to the side wall segments in positive and/or non-positive fashion, and disconnected from them.

21. Line guiding device according to claim 19, where the side wall segments include connecting means designed as snap-in projections that extend in the longitudinal extension of the connecting web and are located in the middle on the associated side face and running in the longitudinal direction of the base web, wherein the connecting elements include at least one pair of snap hooks of claw-like design that snap onto the snap-in projection provided on the web that has a T-shaped longitudinal section.

22. Line guiding device according to claim 20, wherein to form a plug-in connection, the connecting elements display a connecting web that extends perpendicularly to the pivoting plane and has a preferably T-shaped or dovetail-shaped cross-section in the transverse direction, and the end side of the cross-piece web in each case includes a connecting groove that is adapted to the associated connecting web and engaged by this connecting web to establish a detachable connection to the cross-piece web.

23. Line guiding device according to claim 22, wherein the connecting web that extends perpendicularly to the pivoting plane includes at least one free end and said one free end is provided with two snap-in projections that extend in the longitudinal direction of the web when in an installed position and are arranged next to each other and at a same level in relation to the transverse direction, and in that, when in an installed position, the snap-in projections engage snap-in openings provided on said at least one cross-piece web in a locking position.

24. Method for manufacturing a side wall segment, said side wall segment for a line guiding device comprising links connected to each other in pivoting fashion, each of which includes two opposite side parts that are connected to immediately adjacent side parts in a manner permitting pivoting in a pivoting plane, and include stops for limiting a pivoting angle, where a plurality of said adjacent side parts are connected to each other to form the side wall segment, wherein the side parts are connected to each other in one piece by a connecting web that runs in a longitudinal direction of the side wall segment and is flexible in the pivoting plane, and include in each case ay least a web running essentially perpendicularly to said connecting web in the pivoting plane and that has a T-shaped longitudinal section with a base web and a cross web, where the base web is connected to the connecting web and the cross web is located on an end of the base web opposite the connecting web, and face ends of the cross webs pointing in said longitudinal direction form the stops for limiting said pivoting angle, comprising the following process steps:

molding of the side wall segment, where the side wall segment displays a curved shape in the pivoting plane in which the stops are spaced apart from each other;

stressing of the molded side wall segment with a mechanical pre-tension in a tensioning mold, by means of which the side wall segment is given a specific curvature lying in the pivoting plane that is smaller than or equal to that of the side wall segment in a bent position, or by means of which the side wall segment is given a straight or essentially straight shape, and heat treating of the side wall segment in the tensioning mold at a temperature at which the side wall segment stressed by the mechanical pre-tension at least partially relaxes.

\* \* \* \* \*

UNITED STATES PATENT AND TRADEMARK OFFICE
CERTIFICATE OF CORRECTION

| | |
|---|---|
| PATENT NO. | : 7,845,155 B2 |
| APPLICATION NO. | : 12/102230 |
| DATED | : December 7, 2010 |
| INVENTOR(S) | : Thilo-Alexander Jaeker |

It is certified that error appears in the above-identified patent and that said Letters Patent is hereby corrected as shown below:

In column 13, line 2, in claim 24, delete "ay" and insert -- at --, therefor.

Signed and Sealed this
Tenth Day of May, 2011

David J. Kappos
*Director of the United States Patent and Trademark Office*